(12) United States Patent
Porcano

(10) Patent No.: US 9,065,263 B2
(45) Date of Patent: Jun. 23, 2015

(54) MULTIFUNCTIONAL AND CONFIGURABLE WALL PLATES

(71) Applicant: Justin D Porcano, San Francisco, CA (US)

(72) Inventor: Justin D Porcano, San Francisco, CA (US)

(*) Notice: Subject to any disclaimer, the term of this patent is extended or adjusted under 35 U.S.C. 154(b) by 164 days.

(21) Appl. No.: 13/716,060

(22) Filed: Dec. 14, 2012

(65) Prior Publication Data

US 2014/0166333 A1 Jun. 19, 2014

Related U.S. Application Data

(60) Provisional application No. 61/645,451, filed on May 10, 2012.

(51) Int. Cl.
  *H02G 3/14* (2006.01)
  *H01R 13/447* (2006.01)
  *A47K 10/12* (2006.01)
  *H01R 13/639* (2006.01)
  *H01H 9/18* (2006.01)

(52) U.S. Cl.
  CPC ........ *H02G 3/14* (2013.01); *A47K 10/12* (2013.01); *H01R 13/447* (2013.01); *H01R 13/6395* (2013.01); *H01H 9/18* (2013.01)

(58) Field of Classification Search
  CPC ......... H02G 3/14; A47G 29/08; A47K 10/12; H01H 9/18; H01R 13/447; H01R 13/6395
  USPC ................ 174/66; 248/316.7, 205.1, 231.91; 220/241, 3.2, 3.92, 3.94
  See application file for complete search history.

(56) References Cited

U.S. PATENT DOCUMENTS

| | | | |
|---|---|---|---|
| 1,930,610 A | 10/1933 | Despard | |
| 2,392,445 A | 1/1946 | Anderson | |
| 2,438,143 A | 3/1948 | Brown | |
| 2,943,138 A | 6/1960 | Reager | |
| 3,013,105 A | 12/1961 | Craig | |
| 3,838,383 A * | 9/1974 | Wilbur et al. | 439/472 |
| 3,859,454 A * | 1/1975 | Mann | 174/66 |
| 4,335,863 A | 6/1982 | Rapps | |
| 4,339,045 A | 7/1982 | Bodin | |
| 4,425,725 A | 1/1984 | Moustakas | |
| 4,921,444 A * | 5/1990 | Cama | 439/528 |

(Continued)

OTHER PUBLICATIONS

Kessier, Evan. "New Upwell Design." Josh Spear. N.p., Sep. 25, 2008. Web. Jan. 8, 2015.*

*Primary Examiner* — Adrian S Wilson
*Assistant Examiner* — Abhishek Rathod
(74) *Attorney, Agent, or Firm* — Brian S. Boyer; Syndicated Law, PC

(57) ABSTRACT

Multifunctional and configurable wall plate systems are provided and has a vertical base panel for a first utility, the vertical base panel operable for (i) releasably attaching to a wall surface, and (ii) positioning parallel, or substantially parallel, to the wall surface during a use of the wall plate. The systems also have a second utility, as they include a configurable component for the second utility that is releasably attachable to the at least two side surfaces of the vertical base panel to provide at least two configurations of the wall plate system. And, in some embodiments, the panel can be repositioned radially around the vertical base panel to the at least two side surfaces, such that the position of the configurable component relative to the vertical base panel is adjustable for adding flexibility to placement of the single wall plate design.

20 Claims, 6 Drawing Sheets

(56) References Cited

U.S. PATENT DOCUMENTS

| | | | |
|---|---|---|---|
| 5,099,087 A * | 3/1992 | Barrell | 174/66 |
| 5,299,099 A * | 3/1994 | Archambault | 361/837 |
| 5,696,350 A * | 12/1997 | Anker | 174/66 |
| 5,773,760 A * | 6/1998 | Stark et al. | 174/66 |
| D402,271 S | 12/1998 | Weinberg | |
| D402,272 S | 12/1998 | Mezey | |
| D405,347 S | 2/1999 | Mezey | |
| 5,877,450 A | 3/1999 | Quin | |
| 6,012,791 A | 1/2000 | Benner | |
| 6,026,605 A | 2/2000 | Tippett | |
| D429,994 S | 8/2000 | Ziegler | |
| 6,130,384 A * | 10/2000 | Esteves et al. | 174/66 |
| 6,545,218 B1 * | 4/2003 | Blaess | 174/67 |
| 6,593,530 B2 * | 7/2003 | Hunt | 174/66 |
| 6,664,471 B1 * | 12/2003 | Howe, Jr. | 174/66 |
| 6,901,779 B2 | 6/2005 | Magee | |
| 6,969,803 B1 | 11/2005 | Friedberg | |
| 6,977,341 B1 * | 12/2005 | Gustaveson, II | 174/66 |
| 7,067,737 B2 * | 6/2006 | Mallen | 174/66 |
| 7,094,969 B1 * | 8/2006 | In | 174/66 |
| D527,728 S * | 9/2006 | Sbordon, Jr. | D14/253 |
| 7,179,996 B1 * | 2/2007 | Britt et al. | 174/66 |
| 7,230,181 B2 * | 6/2007 | Simmons et al. | 174/66 |
| 7,255,588 B2 | 8/2007 | Wilder | |
| 7,270,436 B2 * | 9/2007 | Jasper | 362/95 |
| 7,279,636 B2 * | 10/2007 | Oddsen et al. | 174/66 |
| 7,279,637 B1 | 10/2007 | O'Young | |
| D564,860 S | 3/2008 | Levin | |
| 7,390,964 B2 * | 6/2008 | Gorin et al. | 174/66 |
| 7,458,479 B1 * | 12/2008 | Thompson | 220/242 |
| 7,528,323 B2 | 5/2009 | Wu | |
| 7,654,405 B2 * | 2/2010 | Provenzano et al. | 220/241 |
| D617,173 S | 6/2010 | Anzalone | |
| 7,812,257 B2 | 10/2010 | Gunderman | |
| 8,203,077 B2 * | 6/2012 | Honeycutt et al. | 174/66 |
| 8,734,181 B1 * | 5/2014 | Waggoner | 439/501 |
| 2004/0035972 A1 * | 2/2004 | Glass | 242/388.6 |
| 2004/0238197 A1 * | 12/2004 | Gates, II | 174/53 |
| 2004/0256134 A1 * | 12/2004 | Jolley | 174/67 |
| 2008/0272258 A1 * | 11/2008 | Wysoczynski | 248/309.1 |
| 2009/0159307 A1 | 6/2009 | Gober | |
| 2011/0132634 A1 * | 6/2011 | Fetzer-Westmeister | 174/66 |
| 2011/0303433 A1 * | 12/2011 | Wagner | 174/66 |

* cited by examiner

MULTIFUNCTIONAL AND CONFIGURABLE WALL PLATES

This application claims the benefit of U.S. Provisional Application No. 61/645,451, filed May 10, 2012.

BACKGROUND

1. Field of the Invention

The teachings provided herein are generally directed to multifunctional and configurable wall plate designs for adding flexibility to placement of a single wall plate design.

2. Description of Related Art

In John Ortberg's book "When the Game Is Over It All Goes Back in the Box", and in James Gleick's 1999 book "Faster", we spend sixteen minutes a day (roughly one year of our lives) looking for lost possessions. Meanwhile, according to another study, the average American burns 55 minutes a day looking for things they know they own but cannot find. That adds up to a total of almost 14 days a year people spend just trying to find lost things. According to yet another study, we clock in 31 minutes a day hunting for lost things—remote controllers (5 minutes), keys (10 minutes), socks and shoes (7 minutes), lottery tickets (4 minutes) and passports (1 minute) and 17 minutes shouting "you had it last".

People constantly struggle to find ways to prevent misplacing daily items, and a common way of solving the problem is to place them in the same location, and preferably a location that is obvious and frequented and in the normal path of daily activities. Solutions include hooks and hangers for keys, hats, dog leashes, and the like, however, many of these hooks and hangers require creating a hole in a wall material that has no other purpose, and such hole often strips-out and requires making a new hole and patching the old hole, if possible. To get around this problem, companies like 3M have created some useful adhesive devices that are vast improvements over what was available in the past, but even these improved adhesive devices fail regularly. Other solutions have included placing a table, or hanging a shelf or cabinet, near a doorway or location of high traffic. Such items may help alleviate the problem, but they can take-up valuable floor space, often create an obstacle to avoid, and need to be moved for routine cleaning and floor maintenance. In addition, things can fall behind tables, and shelves and cabinets also require making holes in the wall material, as well as occasional replacement of hardware and patching of the wall material when they fail or are moved. Some attempts have been made at extending existing wall panels, but these devices lack in configurability, making them difficult to use.

Accordingly, and for at least the above reasons, one of skill would appreciate a multifunctional and configurable wall plate system that helps address the problems set-forth above, and makes use of existing wall fixture hardware, saves valuable floor space, and allows for selecting a desired configuration from a plurality of configurations offered by a single design. Such a system would allow for the tooling manufacture of a single design having sufficient interchangeability with other components, covering a wide variety of configurations and applications and making it practical to market a single solution for an economical residential or commercial use.

SUMMARY

The teachings provided herein are generally directed to multifunctional and configurable wall plate designs for adding flexibility to placement of a single wall plate design.

In some embodiments, the teachings are directed to a multifunctional and configurable wall plate system. The system can comprise a vertical base panel for a first utility and forming a vertical plane and having a front surface, a back surface, and at least two side surfaces, the vertical base panel operable for (i) releasably attaching to a wall surface, and (ii) positioning parallel, or substantially parallel, to the wall surface during a use of the wall plate. The systems also have a second utility, as they include a configurable component for the second utility that is releasably attachable to the at least two side surfaces of the vertical base panel to provide at least two configurations of the wall plate system. The systems also have a fastener surface for releasably connecting the vertical base panel to the wall material in a fixed, or substantially fixed, position relative to an x, y, and z-direction. The x and y directions are on a plane formed by the vertical base panel and are parallel, or substantially parallel, to a vertical plane formed by the wall material; and, the z direction is normal, or substantially normal, to the vertical plane formed by the wall material. In some embodiments, there is no, or substantially no, translational movement of the vertical base relative to the wall material during the use of the wall plate, the translational movement including movement in the x and y direction. And, in some embodiments, the panel can be repositioned radially around the vertical base panel to the at least two side surfaces, such that the position of the configurable component relative to the vertical base panel is adjustable for adding flexibility to placement of the single wall plate design.

It should be appreciated that there can be two or more configurations of the systems. In some embodiments, the configurable component can be repositioned from about 0° to about 180° radially around the vertical base panel. In some embodiments, the system can be designed for use on the left side or the right side of a door opening, such that one design is configured to be multifunctional and configurable for ease of use on the right side or left side of a door.

It should be appreciated that the vertical base panel and the configurable component can be formed as a single piece or at least two pieces. In some embodiments, the vertical base panel and the configurable component are formed as a single piece having at least two configurations upon rotation of the single piece. And, in some embodiments, the vertical base panel and the configurable component are formed as a plurality of pieces having at least two configurations, wherein the vertical base panel doesn't require rotation to have the at least two configurations.

It should be appreciated that the first utility can be any utility. The first utility can be an existing fixture on a wall, for example. In some embodiments, the first utility can include an electrical light switch, power outlet, audiovisual cable outlet, digital media outlet, LAN port, telephone port, combinations thereof, and the like.

It should be appreciated that the systems fasten to a wall, and the fastening can include attaching to an existing wall fixture. An example of such a wall fixture is a junction box for an electrical light switch, power outlet, audiovisual cable outlet, digital media outlet, LAN port, telephone port, combinations thereof, and the like. In some embodiments, the systems include a fastener surface that includes an opening for buttressing the fastening of the multifunctional and configurable wall plate to the wall material at a position other than the underlying junction box.

It should be appreciated that the systems include fasteners for releasably connecting the vertical base panel to the configurable component in at least two positions that are at least about 90° apart and on the vertical plane formed by the vertical base panel. Any fastener known to one of skill can be used, including screws, adhesives, snaps, clips, tongue-and-groove connectors, magnets, and the like.

The second utility can be any utility that would hold or contain items that a user may like to drop-off or pick-up near the first utility of the vertical base plate. In some embodiments, the second utility includes a hook, a hanger, a shelf, a writing surface, a magnetic surface, a basket, a pocket, a tissue dispenser, a picture display, a handheld device, a fixed or portable light source, a cabinet, a security access panel, or a holder for a remote control for a garage, television, and the like.

DETAILED DESCRIPTION

Figure 1:
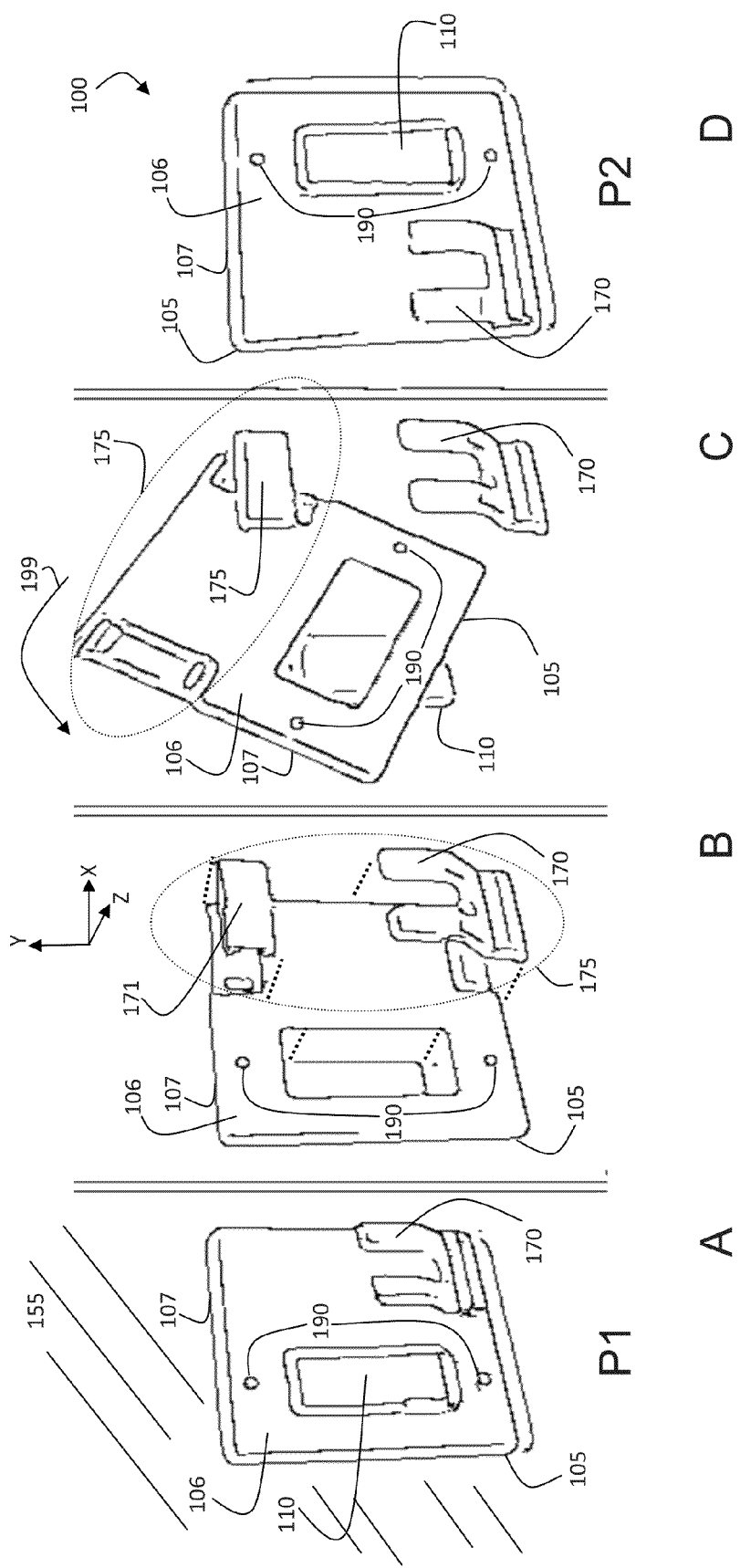
FIGS. 1A through 1D illustrate a single piece, multifunctional and configurable wall plate system having at least two configurations around the circumference of a vertical base panel, according to some embodiments.

A multifunctional and configurable wall plate design is provided as a system for adding flexibility to placement of a single wall plate design. The system makes use of existing wall fixture hardware, saves valuable floor space, and allows for selecting a desired configuration from a plurality of configurations offered by a single design. Such a system would allow for the tooling manufacture of a single design having sufficient interchangeability with other components, covering a wide variety of configurations and applications and making it practical to market a single solution for residential or commercial use.

FIGS. 1A through 1D illustrate a single piece, multifunctional and configurable wall plate system having at least two configurations around the circumference of a vertical base panel, according to some embodiments. In these embodiments, the system 100 can comprise a vertical base panel 105 for a first utility 110 and forming a vertical plane and having a front surface 106, and a back surface 107, the vertical base panel 105 operable for (i) releasably attaching to a wall surface (or wall material) 155, and (ii) positioning parallel, or substantially parallel, to the wall surface 155 during a use of the wall plate.

The systems also have a second utility 170, as they include a configurable component 175 for the second utility 170. In some embodiments, the second utility 170 is releasably attachable to the front surface 106 of the vertical base panel 105, and the position of the second utility 170 can be interchanged with a reconfiguration panel 171 to provide an alternate configuration P2 to an original configuration P1. The alternate configurations P1,P2 may allow a single system design to be reconfigured for use on the left or right side of a doorway, for example, such that the manufacture, marketing, distribution, and use of the system is simplified tremendously over the current state-of-the-art. The systems also have a fastener surface 190 for releasably connecting the vertical base panel 105 to the wall material 155 in a fixed, or substantially fixed, position relative to an x, y, and z-direction. The x and y directions are on a plane formed by the vertical base panel 105 and are parallel, or substantially parallel, to a vertical plane formed by the wall surface 155; and, the z direction is normal, or substantially normal, to the vertical plane formed by the wall surface 155. In some embodiments, there is no, or substantially no, translational movement of the vertical base panel 105 relative to the wall material 155 during the use of the wall plate system 100, the translational movement including movement in the x and y direction.

The term "substantial" can be used to refer to a relative change that does not detrimentally affect the intended use of the panel. Changes can include, for example, a deviation from a parallel position or an amount of a movement of the panel during use. For example, in some embodiments, a change can be either 0, 1, 2, 3, 4, 5, 10, 15, 20, 25, 30, 35, 40, 45, 50, 55, 60, 65, 70, 75, or even 80 percent from the intended use, and the use is not detrimentally affected. In some embodiments, the change should be 25% or less, 20% or less, 15% or less, 10% or less, or 5% or less. In some embodiments, the change should be 3% or less, 2% or less, or 1% or less.

Figure 2:
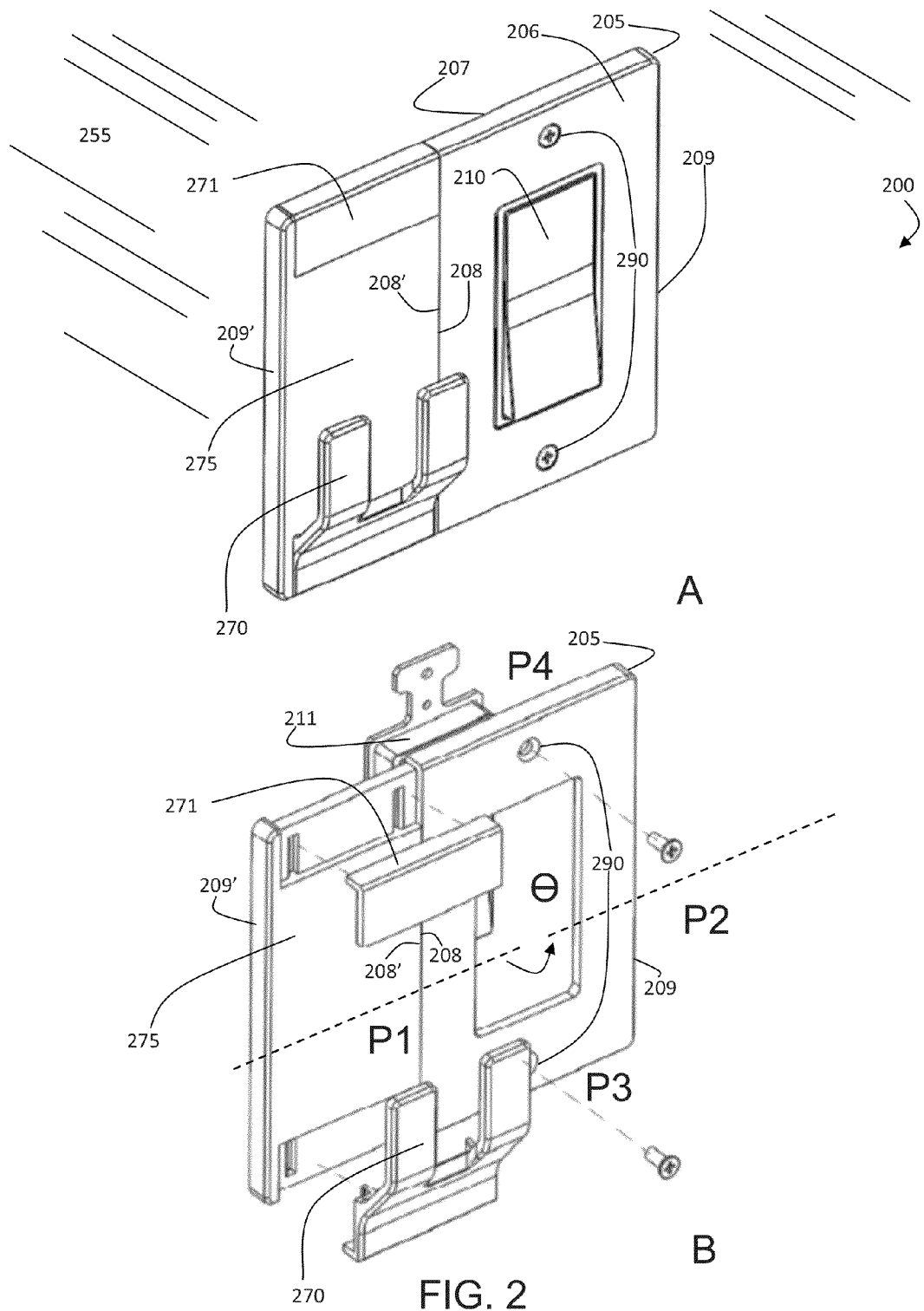
FIGS. 2A and 2B illustrate a multifunctional and configurable wall panel having four configurations around the circumference of a vertical base panel, according to some embodiments.

FIGS. 2A and 2B illustrate a multifunctional and configurable wall panel having four configurations around the circumference of a vertical base panel, according to some embodiments. In these embodiments, the system 200 can comprise a vertical base panel 205 for a first utility 210 and forming a vertical plane and having a front surface 206, a back surface 207, and at least two side surfaces 208,209, the vertical base panel 205 operable for (i) releasably attaching to a wall surface (or wall material) 255, and (ii) positioning parallel, or substantially parallel, to the wall surface 255 during a use of the wall plate.

The systems also have a second utility 270, as they include a configurable component 275 for the second utility 270. In some embodiments, the second utility 270 is releasably attachable to the front surface 206 of the vertical base panel 205. And, in some embodiments, the configurable component 275 is releasably attachable to the at least two side surfaces 208,209 of the vertical base panel 205 to provide at least two configurations of the wall plate system 200. The systems also have a fastener surface 290 for releasably connecting the vertical base panel 205 to the wall material 255 in a fixed, or substantially fixed, position.

As shown in FIG. 2A, the configurable component 275 can be repositioned radially around the vertical base panel 205 to either of the at least two side surfaces 208,209, such that the position of the configurable component 275 relative to the vertical base panel 205 is adjustable to a plurality of positions for adding flexibility to placement of the wall plate system 200. In the position shown, surface 208 is releasably attached to surface 208', and the alternate configuration is to reattach the configurable component 275 such that surface 209 is releasable attached to surface 209'. In some embodiments, the attachments are not releasably attachable. For example, such an attachment can be formed using solvent welding, adhesives, pop-rivets, or other fastening mechanisms known to one of skill that is not releasably attachable.

One of skill will appreciate that the fastener can be virtually any fastener available in the art, to the extent that the fastener will perform as intended to provide the panel in a fixed, or substantially fixed, position relative to an x, y, and z-direction. Fasteners that require tools include, but are not limited to, straps, screws, bolts, and the like. Fasteners that are "tool-free" include, but are not limited to, clips, prongs, cleats, elastomers, hooks, and adjustable variations of the same, as well as combinations thereof. In some embodiments, the tool-free fasteners can include magnets, hook-and-latch (e.g., VELCRO), adhesives, or some combination thereof. In some embodiments, the tool-free fasteners can be positioned, or positionable, as a plurality of prongs or cleats that are configured to insert in an opening. In some embodiments, the fasteners can be inserted under tension to form a releasably connectable friction fitting. As such, one of skill will appreciate that, in some embodiments, the tool-free fasteners can include nearly any means for fastening the system components to each other, or to an underlying wall material or wall surface.

As shown in FIG. 2B, there can be two or more configurations of the systems. In some embodiments, the configurable component 275 can be repositioned at an angle θ from about 0° to about 180° radially around the vertical base panel 205. In some embodiments, the system can be designed for use on the left side or the right side of a door opening, such that one design is configured to be multifunctional and configurable for ease of use on the right side or left side of a door, and connected, for example, to a junction box 211 for a light switch. As shown, surface 208 can be releasably attached to surface 208', and an alternate configuration is to reattach the configurable component 275 such that surface 209 is releasable attached to surface 209'. Similarly, this embodiment allows the configurable component 275 to be alternatively attached at positions P3 and P4, for alternate vertically-placed configurations.

It should be appreciated that the vertical base panel and the configurable component can be formed as a single piece or at least two pieces. In some embodiments, the vertical base panel and the configurable component are formed as a single piece having at least two configurations upon rotation of the single piece. And, in some embodiments, the vertical base panel and the configurable component are formed as a plurality of pieces having at least two configurations, wherein the vertical base panel doesn't require rotation to have the at least two configurations.

Figure 3:
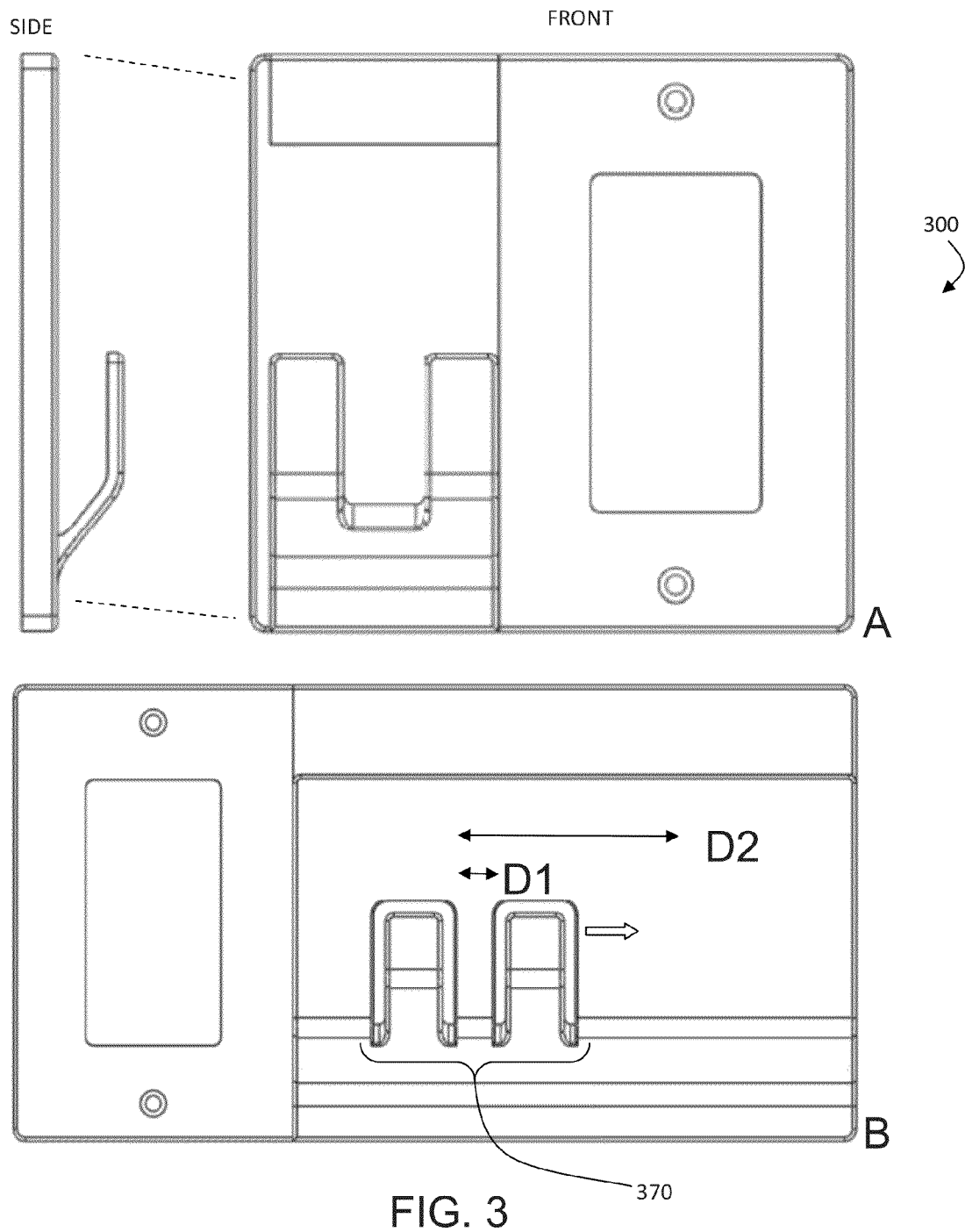
FIGS. 3A to 3D illustrate a multifunctional and configurable wall panel having a variety of hanger configurations, according to some embodiments.
Figure 3:
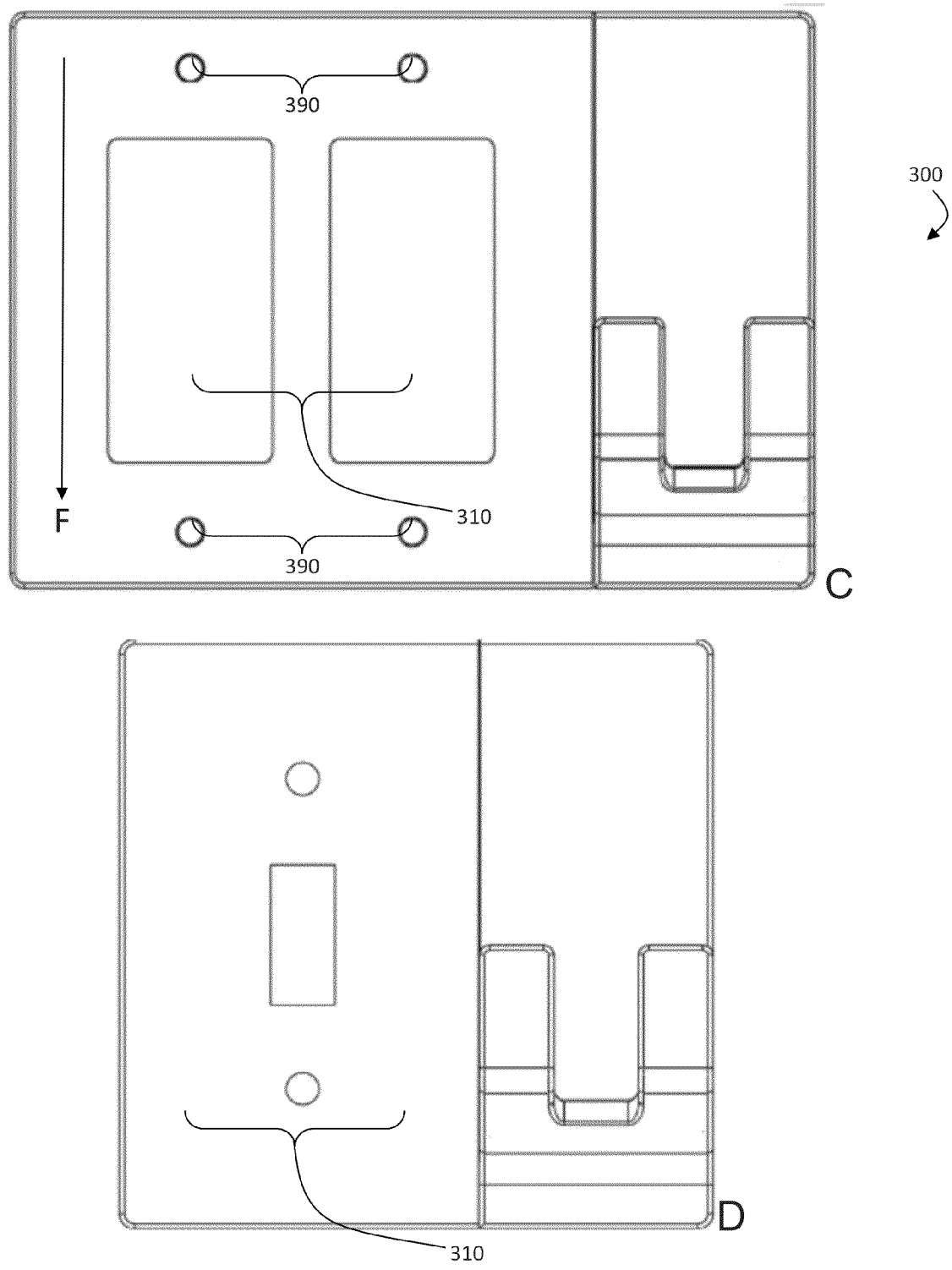

FIGS. 3A to 3D illustrate a multifunctional and configurable wall panel having a variety of hanger configurations, according to some embodiments. FIG. 3A shows front and side views of a system taught herein. FIG. 3B shows a front view of a system having an adjustable second utility 370, in which the second utility 370 also is configurable to at least positions D1 and D2. FIG. 3C shows the first utility 310 is a double panel switch having 4 fastener surfaces 390 adding extra wall fixture strength for the multifunctional utility load F that can be applied to the system 300. FIG. 3D shows the system 300 designed for use with a conventional toggle light switch.

Figure 4:
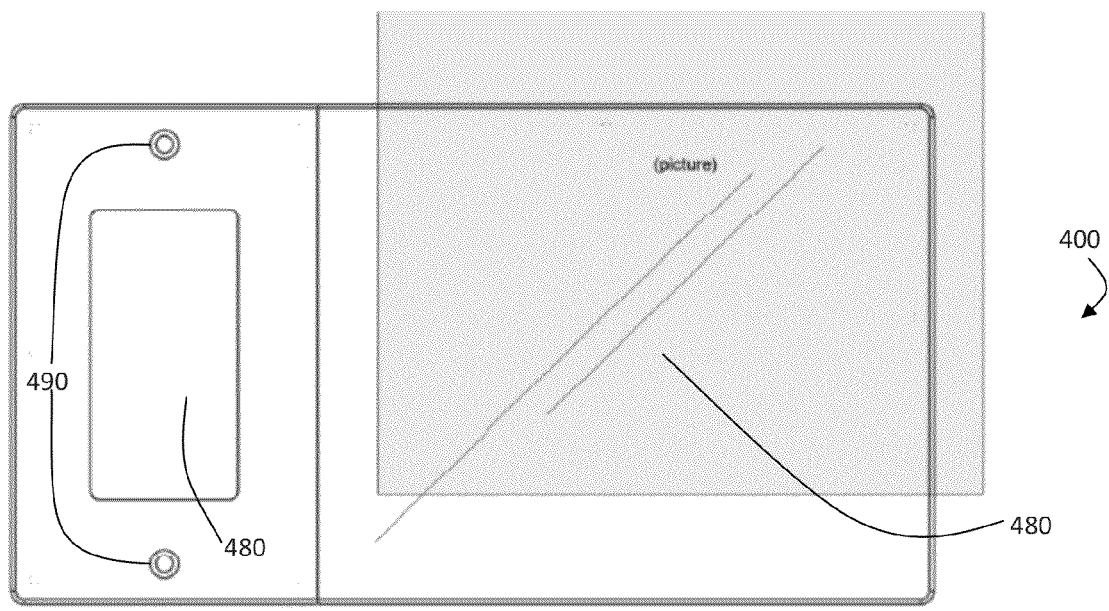
FIG. 4 illustrates a multifunctional and configurable wall panel having a picture display, according to some embodiments.

FIG. 4 illustrates a multifunctional and configurable wall panel having a picture display, according to some embodiments. The system 400 can be designed to have a low weight and carry a light load, such that the existing junction box fastener surfaces 490 for the light switch 410, for example, can have sufficient load bearing capacity to hold the picture 480.

One of skill will appreciate that the wall panel systems can be fabricated from any suitable material, such as plastic or metal, or a combination thereof. A particular material or design may be desirable, for example, to provide material strength characteristics for a given use, material affordability for economical manufacture and sale, and the like. The wall panel system can be molded as one or more pieces, assembled from a plurality of pieces, or a combination thereof. And, it should be appreciated that the wall panel system can be manufactured in any size or design suitable for a particular purpose, where the number, location and type of fasteners needed for the purpose can be readily determined by one of skill, and the design of the system can be altered to accommodate any desired fastening configuration suitable for a particular use. In some embodiments, for example, the number and location of fasteners available on a junction box may be insufficient for a particular load, and the system can include additional fasteners and fastening means to address the load considerations.

One of skill will appreciate that the wall panel systems can have fasteners that require tools, or the fasteners can be tool-free. For example, the tool-free fasteners can be positioned, or positionable, as a plurality of prongs, cleats, snaps, and the like, that are configured to insert in an opening between components, or without an opening to, perhaps, "clip" components together. In some embodiments, the fasteners can be inserted under tension to form a releasably connectable friction fitting between the fasteners and the components. An example may be a tongue-and-groove configuration retained by tensioned clips. In some embodiments, the tool-free fasteners can be positioned, or positionable, as a plurality prongs configured to insert in an opening in the components to form a releasably connectable friction fitting. One of skill will appreciate that, in some embodiments, the fasteners can include nearly any means for fastening the system components to each other or to a wall surface. Any fastener known to one of skill can be used, including screws, adhesives, snaps, clips, tongue-and-groove connectors, magnets, and the like.

The term "tool-free" can be used to refer to what is needed to attach or detach the panel, or reconfigure the panel, for an intended use. In some embodiments, the panel can be attached, or configured, without tools using only a pair of hands. In some embodiments, the panel can be detached without tools using only a pair of hands. In some embodiments, the panel can have its own specialized "tool" included with the panel, such that the term "tool-free" may refer to a lack of a need for an extra tool. One of skill will appreciate that the term "tool" includes what one of skill would ordinarily consider to be a tool including, but not limited to, a screwdriver, a wrench, a hammer, pliers, and the like.

It should be appreciated that the first utility can be any utility. The first utility can be an existing fixture on a wall, for example. In some embodiments, the first utility can include an electrical light switch, power outlet, audiovisual cable outlet, digital media outlet, LAN port, telephone port, combinations thereof, and the like.

It should be appreciated that the systems fasten to a wall, and the fastening can include attaching to an existing wall fixture. An example of such a wall fixture is a junction box for an electrical light switch, power outlet, audiovisual cable outlet, digital media outlet, LAN port, telephone port, combinations thereof, and the like. In some embodiments, the systems include a fastener surface that includes an opening for buttressing the fastening of the multifunctional and configurable wall plate to the wall material at a position other than the underlying junction box.

It should be appreciated that the systems include fasteners for releasably connecting the vertical base panel to the configurable component in at least two positions that are at least about 90° apart and on the vertical plane formed by the vertical base panel.

Figure 5:
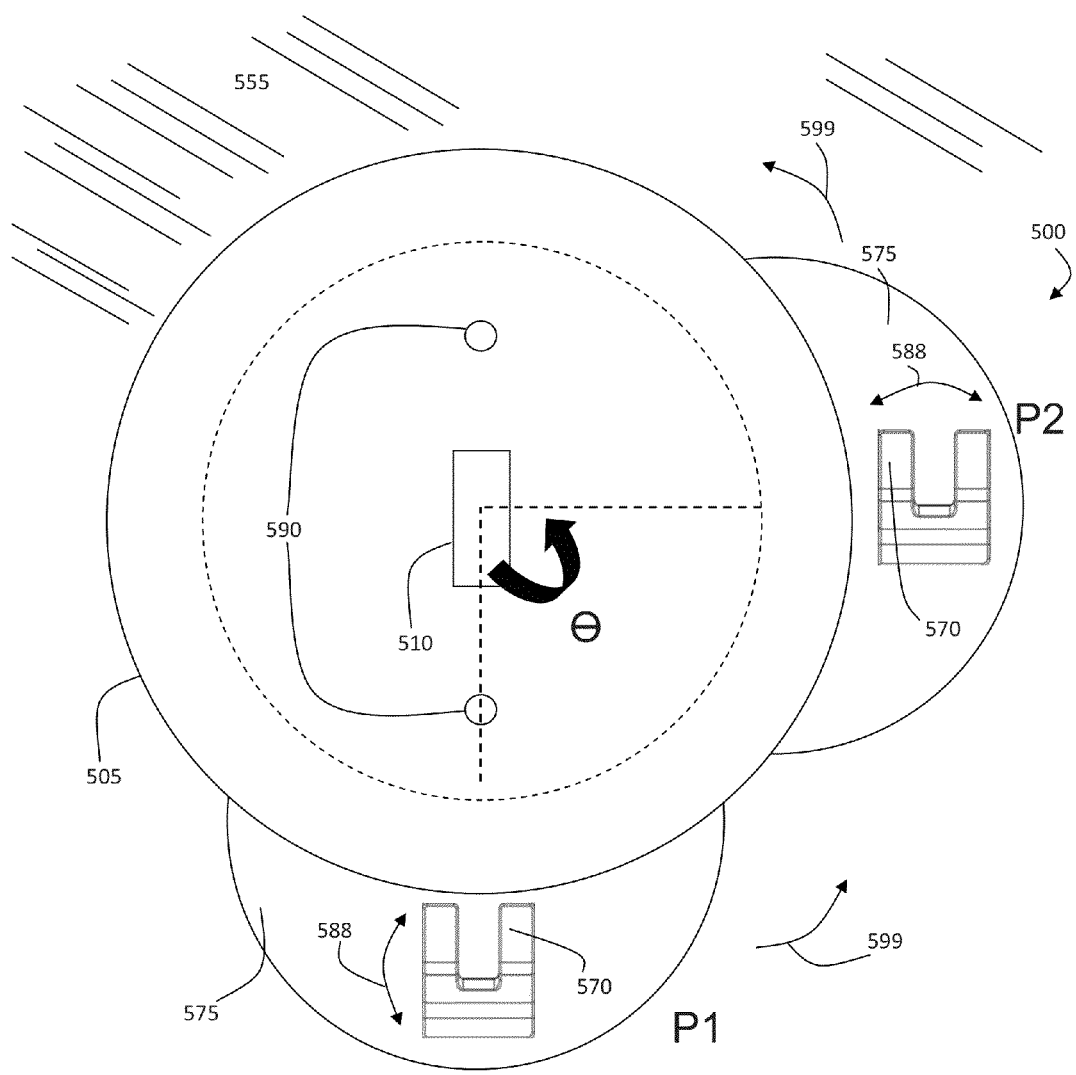
FIG. 5 illustrates a multifunctional and configurable wall panel having configurations that span up to about 180° around the sides of a vertical base panel, according to some embodiments.

FIG. 5 illustrates a multifunctional and configurable wall panel having configurations that span up to about 180° around the sides of a vertical base panel, according to some embodiments. As shown in FIG. 5A, the system 500 has a standard toggle light switch for a first utility 510, and the second utility 570 can be repositioned 588, and the configurable component 575 can be releasably attached and moved 599 to varying radial angles θ around the perimeter of the vertical base panel 505, or non-releasably attached, around the entire 360° perimeter of the vertical base panel 505. The positions P1 and P2 shown in the FIG. 5 are about 90° apart, but any plurality of 2, 3, 4, or more configurable components can be used and positioned in any combination of angles θ independently selected between components in amounts ranging from, for example, about 10° to about 180°, about 20° to about 170°, about 30° to about 160°, about 40° to about 150°, about 50° to about 140°, about 60° to about 130°, about 70° to about 120°, about 30° to about 90°, about 45° to about 120°, or any angle or range therein in increments of 1°. In fact, in such embodiments, the second utility can be repeated at several locations, or a third utility, fourth utility, fifth utility, and so on, can be added. Such a centrically positioned system can help balance the load around the fastener surfaces 590, allowing a smaller number of fasteners for a given total load. Additional fasteners, of course, can be added to help carry a given load by increasing the fastening of the system directly to the wall material 555.

In some embodiments, the panel has at least two utilities, such that the panel is not intended for a single use. Uses can include, for example; hanging, containing, or dispensing any item that weighs less than 4 pounds, from about 2 oz to about 4 lb, from about 5 oz to about 3 lb, from about 12 oz to about 1 lb, from about 1 oz to about 1 lb, or any range therein in increments of 1 oz. Examples may include hanging or containing first aid equipment; hanging a writing board; serving as a platform for home items; hanging or containing tools, gloves, hats, umbrellas, jackets, purses, and the like; a corkboard for displaying items; a clipboard; a chalkboard, greaseboard, or dry-erase board; a support surface for drinks or foods; garbage or pet-waste disposal containers; dispensing other bags, tissues, rubber gloves, and the like; dispensing chemicals or fluids such as hand lotions, soap, or disinfectants; and holding or supporting a food or candy dispenser; hanging communications equipment, such as a portable phone; hanging lighting, an LED display, cameras, or speakers; hanging any electronic equipment, such as sensors or transmitters; hanging security equipment; or any combination of the above. It should be appreciated that any of the electronic equipment can be powered by any electrical source whether AC or DC including, but not limited to, battery power, solar power, or power from any source known to one of skill.

The second utility, for example, can be in fact any utility that would hold or contain items that a user may like to drop-off or pick-up near the first utility of the vertical base plate. In some embodiments, for example, the second utility includes a hook, a hanger, a shelf, a writing surface, a magnetic surface, a basket, a pocket, a tissue dispenser, a picture display, a handheld device, a fixed or portable light source, a cabinet, a security access panel, or a holder for a remote control for a garage, television, and the like.

One of skill will appreciate that multifunctional and configurable wall plate designs can be fabricated from any suitable material, such as plastic or metal, or a combination thereof. The multifunctional and configurable wall plate designs can be molded as one or more pieces, assembled from a plurality of pieces, or a combination thereof. Any known manufacturing process such as casting, extrusion, milling, and multicomponent assembly using any means can be used to produce the systems taught herein. And, it should be appreciated that the multifunctional and configurable wall plate designs can be manufactured in any size suitable for a particular purpose, where the number and type of fasteners needed for the purpose are set-forth herein, or otherwise can be readily determined by one of skill.

One of skill reading the teachings will appreciate that the concepts can extend into additional embodiments that go well-beyond a literal reading of the claims, the inventions recited by the claims, and the terms recited in the claims.

I claim:

1. A multifunctional and configurable wall plate system for adding flexibility to placement of a single wall plate design, comprising:
   a vertical base panel having an independent first area exclusively for a first utility and an independent second area adjacent to the first area and adapted for at least a second utility, the independent second area having a first point of attachment for a first configuration of the system and a second point of attachment for a second configuration of the system, the vertical base panel forming a vertical plane and having a front surface, a back surface, and at least two side surfaces, the vertical base panel operable for (i) releasably attaching to a wall surface, and (ii) positioning parallel, or substantially parallel, to the wall surface during a use of the wall plate;
   a configurable component having the second utility and the second utility releasably attachable to the first point of attachment in the first configuration of the system and the second point of attachment in the second configuration of the system and, a reconfiguration panel covers only the first point of attachment in the second configuration of the system or only the second point of attachment in the first configuration of the system; and,
   a fastener surface for releasably connecting the vertical base panel to the wall material in a fixed, or substantially fixed, position relative to an x, y, and z-direction;
   wherein, the x and y directions are on a plane formed by the vertical base panel and are parallel, or substantially parallel, to a vertical plane formed by the wall material;
   the z direction is normal, or substantially normal, to the vertical plane formed by the wall material;
   there is no, or substantially no, translational movement of the vertical base relative to the wall material during the use of the wall plate, the translational movement including movement in the x and y direction; and,
   the second utility is selected from the group consisting of a hook, a hanger, a shelf, a writing surface, a magnetic surface, a basket, a pocket, a tissue dispenser, a picture display, a cabinet, a security access panel, or a holder for a remote control device.

2. The system of claim 1, wherein the configurable component can be repositioned from about 0° to about 180° radially around the vertical base panel.

3. The system of claim 1, wherein the vertical base panel and the configurable component are formed as a single piece adapted to provide at least an additional point of attachment for at least a second configurable component for at least a third utility.

4. The system of claim 1, wherein the vertical base panel is adapted for, and the configurable component is formed as, a plurality of pieces to provide for an adjustable configuration for the second utility.

5. The system of claim 1, wherein the first utility includes a power outlet.

6. The system of claim 1, wherein the first utility includes a light switch.

7. The system of claim 1, wherein the first utility includes an audiovisual cable outlet.

8. The system of claim 1, wherein the fastener surface is an opening for buttressing the fastening of the wall plate to the wall material, the buttressing adding to the fasteners for attaching the wall plate to an underlying junction box.

9. The system of claim 1, further comprising a fastener for the releasably connecting of the vertical base panel to the configurable component in at least two positions that are at least about 90° apart and on the vertical plane formed by the vertical base panel.

10. The system of claim 1, wherein the second utility is a hook or hanger.

11. The system of claim 1, wherein the second utility is a shelf.

12. The system of claim 1, wherein the second utility is a writing surface.

13. The system of claim 1, wherein the second utility is a magnetic surface.

14. The system of claim 1, wherein the second utility includes a basket or a pocket.

15. The system of claim 1, wherein the second utility is a tissue dispenser.

16. The system of claim 1, wherein the second utility is a picture display.

17. The system of claim 1, wherein the second utility is a charger for a handheld device.

18. The system of claim 1, wherein the second utility is a light source.

19. The system of claim 1, wherein the second utility is a cabinet.

20. The system of claim 1, wherein the second utility is a holder for a television remote control.

\* \* \* \* \*